3,082,222
STEROID ACID-ESTERS AND SALTS THEREOF, AND METHOD OF MAKING THE SAME
Erwin Ott, Kappisweg 5, Stuttgart, Germany
No Drawing. Filed Mar. 16, 1959, Ser. No. 799,445
Claims priority, application Germany Mar. 26, 1958
3 Claims. (Cl. 260—397.4)

Heretofore, no method has been known for bringing about a slow physiological absorption of intramuscularly injected deposits of highly concentrated aqueous solutions of salts of hormone ester acids. Such a slow absorption imitates as closely as possible the natural gradual formation of hormones in an organism. It is known that the absorption of injected oily solutions of free hormones such as testosterone, oestrone and oestradiol, and of their esters, often takes place too quickly, causing nervous attacks which may be of long duration. For example, oily solutions of testosterone propionate are absorbed from deposits thereof in two weeks; solutions of "Depotviron" (Hoechst) are completely absorbed in four weeks' time.

It has been found that the alkamine salts of carboxylic ester-acids of testosterone, injected as deposits of aqueous solutions containing 35–40 percent of the hormone, require more than three months for complete absorption. Absorption of these deposits closely imitates natural production of the hormone, avoiding nervous attacks, even if considerable amounts (700 to 800 mg.) of the hormone are injected in a single depot. In addition to the salts of carboxylic acids such as succinic, maleic, phthalic and camphoric acids, the salts of ester acids of malonic acid are especially suitable for this purpose because they can easily be prepared using malonic-hemichlorides without significant loss of the precious hormones.

The basic component of most of the soluble salts are those tri-alkamines having only secondary or tertiary alcoholic groups, such as tri(propanol-2) amine, tri(butanol-2) amine, and especially tri-isobutanolamine, having tertiary alcoholic groups. It has been found that alkamines, such as tri-ethanolamine, having primary alcohol groups, decompose acid-esters of hormones by alcoholysis within a short time. On the contrary, acid-ester salts with alkamines having only secondary alcohol groups, or especially tertiary alcohol groups, are very resistant not only to alcoholysis, but are also resistant to hydrolysis in neutral or acid solution, even when boiled.

In spite of the slow absorption from intramuscularly injected depots of concentrated aqueous solutions of these alkamine salts, absorption through mucous membranes occurs quickly and completely, so that such salts can be administered per os in small daily doses of 5 to 15 mg. of hormone. In such cases, decomposition of the alkamine salts of the acid-esters by stomach-acids should be avoided.

The following examples are illustrative of the invention.

*Example 1*

Testosterone hemimalonate was prepared by dissolving two parts of testosterone in about 20 parts of dioxane free of traces of water. One part of crystallized, very pure malonic hemi-chloride is added, and begins to react instantaneously. The hydrochloric acid formed is permanently removed with a vacuum water-pump. At the same time, dioxane is gradually evaporaed without raising the temperature above room temperature. The solid residue of carboxylic acid-ester is extracted and washed with a small amount of dry ether, in which the excess of malonic hemi-chloride is completely dissolved. The ether is removed under vacuum. The hemi-malonate of testosterone can be recrystallized from hot ether, but is so pure that it can be used without recrystallization. Losses of 10–20 percent of the hormone by formation of testosterone malonate can occur if the malonic hemi-chloride used is contaminated with malonic dichloride, produced as a by-product in the manufacture of the hemi-chloride.

*Example 2*

The tri-isobutanolamine salt of testosterone malonic ester-acid is prepared by dissolving equivalent quantities of the ester-acid of Example 1 and of pure, crystalline tri-isobutanolamine in a very small amount of acetone. Water is added and acetone evaporated from the solution, which is then brought to the desired aqueous concentration. Aqueous solutions containing 35–40 percent of the hormone in the form of the ester-acid salt can be injected even using narrow cannulae. Their viscosity is similar to that of glycerin.

*Example 3*

The assimilation of the salts in application per os is illustrated herein. An acetone solution of the triisobutanolamine salt of the malonic hemi-ester of testosterone produced as in Example 2, is mixed with dry sodium citrate. After removal of the acetone on a steam bath, the dry residue is inserted into gelatin capsules soluble in the intestine. A desired daily dose of testosterone (5–15 mg.) can be given in this manner. Resorption by the intenstine is always complete.

*Example 4*

Equivalent quantities of oestron, oestradiol, stilbosterol and other hormones having phenolic groups react with malonic hemi-chloride in dioxane by heating on a steam bath until hydrochloric acid has ceased to form. After removal of dioxane under vacuum, the hemi-ester residues are dissolved, with tri-isobutanolamine, in acetone. Water is added and acetone removed on a steam bath. The aqueous solutions of these salts can be injected or given per os in a manner analogous to that described in Examples 2 and 3.

*Example 5*

Equivalent quantities of tribromo-ethyl alcohol, amylene hydrate, or similar tertiary alcohols such as 3-methyl-pentanol-3, methyl-testosterone and other hormones with tertiary alcoholic groups can be reacted with malonic-hemichloride to form acid-esters as in Example 4, and can be employed in aqueous solutions in the form of tri-isobutanolamine salts.

I claim:
1. A compound of the formula

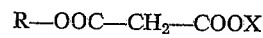

wherein R is a member selected from the group consisting of 17-deoxytestosterone and 17-deoxyoestradiol and X is a trialkanol amine selected from the group consisting of tri(propanol-2) amine, tri(butanol-2) amine, and triisobutanolamine.

2. The triisobutanol amine salt of testosterone-17-hemi-malonate.

3. The triisobutanol amine salt of oestradiol-17-hemi-malonate.

References Cited in the file of this patent

UNITED STATES PATENTS

| | | |
|---|---|---|
| 2,384,550 | Inhoffen | Sept. 11, 1945 |
| 2,557,655 | Hebo | June 19, 1951 |
| 2,683,725 | Murray et al. | July 13, 1954 |
| 2,885,413 | Hogg | May 5, 1959 |

OTHER REFERENCES

Recent Progress in Hormone Research, Gregory Pincus, vol. XIII, 1957, Academic Press Inc., N.Y. Pages 389–390 relied on.

Noller: Chemistry of Organic Compounds, 2nd ed., 1957, W. B. Saunders Co., Philadelphia, Pa., pages 234–236.